United States Patent [19]

Cohen

[11] Patent Number: 4,486,075

[45] Date of Patent: Dec. 4, 1984

[54] MIRROR ASSEMBLY FOR A VEHICLE

[76] Inventor: Stephen R. Cohen, 1127 Bay Park Pl., Far Rockaway, N.Y. 11691

[21] Appl. No.: 424,575

[22] Filed: Sep. 27, 1982

[51] Int. Cl.³ .............................. G02B 5/08; G02B 5/10
[52] U.S. Cl. ..................................... 350/603; 350/616; 350/632
[58] Field of Search ............... 350/300, 307, 302, 303, 350/304, 299

[56] References Cited

U.S. PATENT DOCUMENTS

| 1,748,837 | 2/1930 | Greensfelder | 350/302 |
|---|---|---|---|
| 1,849,001 | 3/1932 | Fisher | 350/304 |
| 2,783,683 | 3/1957 | Maurer | 350/307 |
| 3,048,084 | 8/1962 | Ianuzzi | 350/304 |
| 3,276,731 | 10/1966 | Orchard | 350/299 |
| 3,367,616 | 2/1968 | Bausch et al. | 350/307 X |
| 4,281,898 | 8/1981 | Ochiai et al. | 350/302 X |
| 4,381,142 | 4/1983 | McColgan | 350/300 X |

FOREIGN PATENT DOCUMENTS

| 2937543 | 4/1981 | Fed. Rep. of Germany | 350/307 |
|---|---|---|---|
| 201374 | 8/1923 | United Kingdom | 350/303 |

Primary Examiner—John K. Corbin
Assistant Examiner—Richard F. Gallivan

[57] ABSTRACT

A mirror assembly for a vehicle having a mirror unit with a convex mirror on one side and a flat mirror on the other side. A support holds the mirror unit and couples it with respect to the vehicle. The mirror unit is arranged so that one of the sides of the mirror unit can be directed to face rearward of the vehicle. A manipulation mechanism provides selective inversion of the mirror whereby the desired one of the convex or flat mirrors can be selected as the rearward facing mirror.

25 Claims, 33 Drawing Figures

MIRROR ASSEMBLY FOR A VEHICLE

BACKGROUND OF THE INVENTION

This invention relates to a mirror assembly for use on a vehicle and more particularly to a reversible mirror which can be utilized with a rear or side view mirror on a vehicle.

Vehicles, such as trucks, cars, motorcycles, etc, are equipped with mirrors to permit the driver to view what is behind him. In this manner, the driver can be aware of approaching vehicles from behind and other rearwardly occurring situations. Typically, the vehicle may have a rear view mirror positioned within the vehicle and located near the top of the front windshield. Additionally, it is typically provided with a side view mirror on at least the drivers side, and often on both sides of the vehicle.

One problem with existing rear and side view mirrors, is that they provide only a limited scan of what is occurring behind the vehicle. This scan does not cover the entire back of the vehicle and accordingly, the driver is often at a loss for what is truly going on behind him. There are areas that are not covered by the rear view and side view mirror and accordingly create what is typically known as "blind spots" in the complete rear scan.

In order to remove these "blind spots" and provide a wide angle of view, there has been suggested many solutions. For example, some mirrors provide a plurality of individual mirrors adjacent to each other in an arcuate shape in order to provide a wide angle rear view mirror. Others utilize a convex mirror in place of the regular mirror in order to provide a wide angle coverage. Others suggest the utilization of a convex spot mirror which is self adhesive onto the rear view or side view mirror.

All of these proposed solutions provide improvements. However, they are either cumbersome, awkward to utilize, massive, or difficult to install. Furthermore, despite their availability, they still do not provide particular individualized solutions to the problem. Specifically, each driver requires his own individual adjustment in order to properly view the entire panoramic rear view. By placing a convex spot onto the existing side view mirror, the mirror may be well adjusted for the flat portion of the mirror but may be awkward for the convex portion. Alternately, by utilizing an additional convex mirror, a particular driver may not always want the convex mirror since it does provide a distorted view. Occasionally, the use of a regular mirror is desired. For example, when parking the vehicle, it is preferable to utilize a standard flat mirror as the side view mirror rather than the convex mirror. However, when highway driving the convex mirror might be preferable for certain situations.

Accordingly, while many solutions have been successful, none of them have as yet provided complete flexibility and ability for individualized selective utilization of rear view and side view mirrors to particularly alleviate the problem for the individual drivers.

SUMMARY OF THE INVENTION

Accordingly, it is an object of the present invention to provide an improved mirror assembly for vehicles which can avoid problems of prior art devices attached to existing side view and rear view mirrors in order to improve the panoramic view of the situation behind a vehicle.

Another object of the present invention is to provide a mirror assembly including a mirror unit having a selectively reversible convex mirror on one side and a flat or prismatic mirror on the opposing side.

Yet another object of the present invention is to provide a mirror assembly for a vehicle which can include one or more mirror units adjacent to each other, each of which can have a convex mirror on one side and a flat or prismatic mirror on the other side, and each of which are independently adjustable.

Still a further object of the present invention is to provide a mirror assembly having a mirror unit with a convex mirror on one side and a flat or prismatic mirror on the opposing side and which can be easily attached to existing side or interior rear view mirrors in order to provide complete separate and independent manipulation of the mirror unit.

Briefly, in accordance with the present invention, there is provided a mirror assembly for a vehicle. The mirror assembly includes a mirror unit having a convex mirror on one side with a flat or prismatic mirror on the opposing side. A support mechanism is provided for holding the mirror unit. A coupling arrangement retains the support mechanism with with respect to the vehicle such that one of the sides of the mirror unit can be directed to face the driver and thereby be rearwardly directed. A manipulation device is coupled to the support mechanism for providing selective inversion of the mirror. In this manner, the desired one of the convex or flat or prismatic mirrors can be selected as the rearward facing mirror.

In an embodiment of the invention, the mirror unit is coupled to a standard rear view or side view mirror. The coupling can include ball swivel joints, or a double hinge arrangement in order to provide the necessary independent manipulations of the mirror unit. Additionally, there can be provided a C-shape clamp which slidably and pivotally holds the mirror unit in order to permit the mirror unit to be inverted and/or stored on top of, beneath, or beside a rear view mirror.

In an embodiment of the invention, the mirror unit can be integrally formed or attached to the sun visor and be lowered into an operative position when desired.

These and other objects, features and advantages of the invention, will, in part, be pointed out with particularity and will, in part, become obvious from the following more detailed description of the invention taken in conjunction with the accompanying drawings, which form an integral part thereof.

DESCRIPTION OF THE PREFERRED EMBODIMENT

Figure 1:
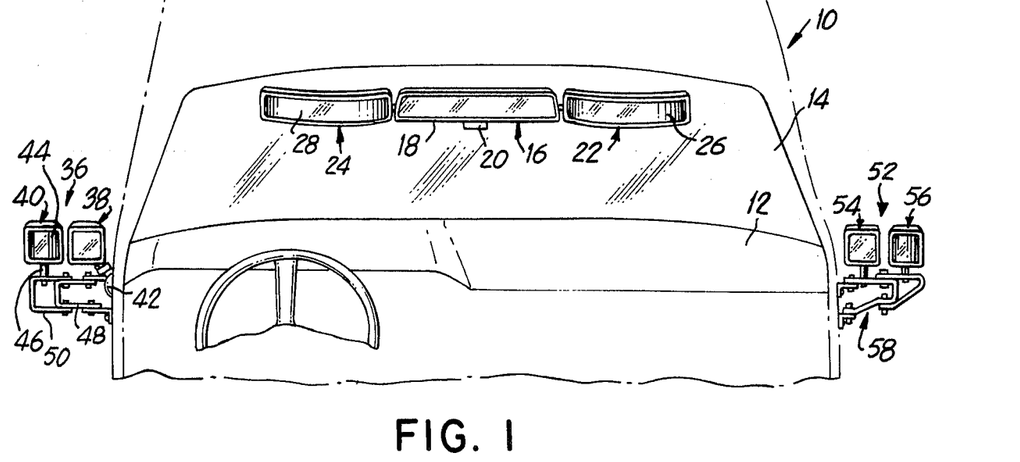
FIG. 1 is a perspective view of the dashboard portion of a vehicle showing the mirror assembly of the present invention utilized in conjunction with a rear view mirror as well as with both side view mirrors.

Referring now to FIG. 1, there is shown a view of the inside of a vehicle 10 showing a dashboard 12 with a front windshield 14 on which is secured a standard rear view mirror 16. The rear mirror is typically shown included within a peripheral housing 18 and is fastened to the windshield by means of a conventional arm. The rear view mirror 16 is typically of the prismatic type so that it can be moved between a night and day position in order to avoid glare. A downward depending lever 20 is available for flipping the prismatic mirror between its two positions.

Figure 2:
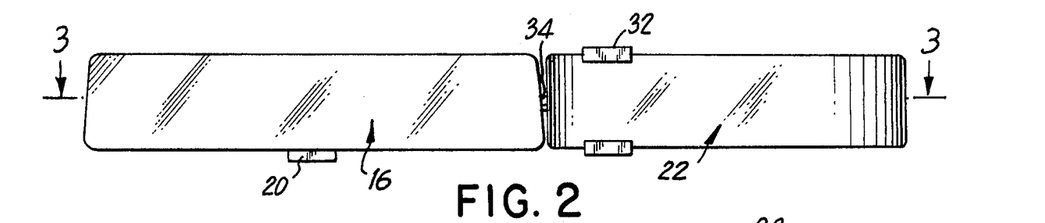
FIG. 2 is a schematic drawing showing the mirror assembly of the present invention adjacent to an existing rear view mirror.
Figure 3:
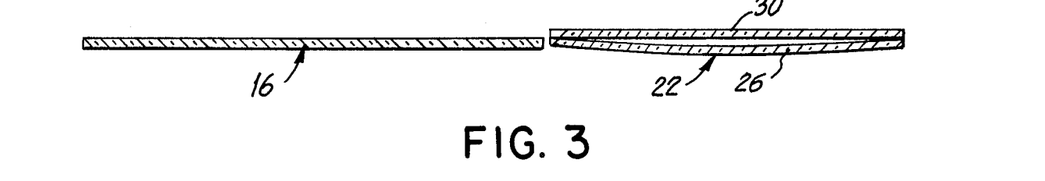
FIG. 3 is a sectional view taken along line 3—3 of FIG. 2.

Positioned laterally on either side of the rear view mirror 16, there are provided mirror assemblies 22, 24 in accordance with the present invention. These mirror assemblies are shown to have a convex shaped mirror 26, 28 being utilized and facing rearward of the vehicle. The lateral mirror assemblies 22, 24, are interconnected by means of connecting means to be hereinafter described. However, such connection means permit inverting of the mirrors 22, 24 so as to place the reverse side of these mirrors in a direction facing the driver and directed rearwardly of the vehicle As best shown in FIGS. 2 and 3, the mirror assembly 22 is shown to be formed of a convex mirror 26 on one side thereof and a flat or prismatic mirror 30 on the opposite side thereof. In this manner, the mirror assembly 22 can be flipped over so that either the convex mirror 26 or the flat mirror 30 is directed facing the driver and directed rearwardly of the vehicle.

In this manner, with the two laterally extending mirror assemblies 22, 24 having their flat sections facing the driver, there is provided a very wide angled rear view mirror which can encompass a panoramic view of the rear of the vehicle for the driver. At the same time, at the selection of the driver, either one or both of the lateral mirror assemblies 22, 24 can be inverted so that the convex mirror thereof is facing toward the driver. In this way, the driver can continue utilizing the standard rear view mirror to provide a regular sized image of the rear and he can gain a further wide angle view of the entire rear by means of the lateral convex shaped mirror assemblies 22, 24.

By way of example, FIG. 2 shows a clamping arrangement between the two mirrors 16, 22 that includes a C-shaped clamp 32 retained by means of a connecting arm 34. Although numerous alternative arrangements are shown hereinafter, it should be appreciated that the arrangement is such that the lateral mirror 22 is retained closely adjacent the main rear view mirror 16 so that when the two mirrors are being utilized, especially when both have their flat mirrors facing the driver, there appears a substantial continuity between the adjacent mirrors having very little, if any, gap therebetween. Although there is shown laterally extending mirror assemblies 22, 24 on either side of the existing rear view mirror 16, it should be appreciated that only one of these need be provided. Furthermore, it should also be appreciated, that instead of the existing rear view mirror 16, the entire mirror can be replaced with a mirror assembly of the present invention having a convex mirror on one side thereof with a flat mirror on the other side thereof. Additionally, the flat mirror which is utilized in any of the mirror assemblies can actually be part of a prismatic mirror.

Accordingly, the essential concept being presented concerns the utilization of a mirror assembly having a convex mirror on one side thereof with a flat mirror on the other side thereof. The flat mirror can actually be part of a prismatic mirror providing glare free night and day selective viewing. The mirror is of a reversible type so that either the convex portion or the flat portion can be selectively placed in a position to face the driver of the vehicle. In this manner, the driver can selectively utilize either the convex portion of the mirror or the flat portion of the mirror, as he finds it necessary.

This concept can therefore be utilized as the main rear view mirror. Alternatively, it can be utilized as shown in FIG. 1, wherein such mirror assembly is utilized as a lateral extension on one or both sides of the existing rear view mirror.

Additionally, this same concept can be utilized for side view mirrors. Specifically, as shown on the left of FIG. 1, there exists a side view mirror assembly 36 formed of two adjacent mirrors 38, 40. Mirror 38 is shown to be of the standard side view mirror type which is normally existing on the vehicle and is held by means of the retaining arm 42. The adjacent mirror 40 is of the mirror assembly of the present invention which is of the reversible type. The particular convex mirror 44 is shown facing the driver. However, the mirror 40 can be turned around by means of the pivot arrangement 46 so that the flat mirror side of that can be facing toward the driver.

In this manner, the driver can selectively retain the existing side view mirror 38 and utilize the additional mirror 40 either in its convex mode or reversing it so that it will have a flat mirror surface rearward facing. When the two surfaces are both flat, there is effectively provided a wider panoramic view of the back. When one mirror provides a convex surface, in addition to the standard view provided on the flat mirror from the side view mirror 38, there is also provided a complete wide angle view of the entire rear portion of the vehicle through the convex surface 44 of the adjacent mirror assembly 40.

The particular additional mirror assembly 40 is held by means of a double U-shaped bracket arrangement. The first bracket 48 is secured to the car and to the existing arm, 42, with an additional bracket 50 provided to secure the additional mirror assembly 40. The two brackets are pivotally held with respect to each other to provide independent manipulation of the two side view mirrors. This embodiment will be further described in connection with FIG. 23 where more details thereof will be provided.

The right side also includes a side view mirror assembly 52 which again includes adjacent side view mirrors 54 and 56.

Again, one or both of these mirrors can be of the type presently described, having a convex surface on one side and a flat surface on the other. The mirror 54 can be of a type existing on the vehicle wherein the additional mirror 56 is of the type having a convex surface on one side and a flat mirror on the other side. Alternately, both the mirrors 54 and 56 can be of the type each having a convex mirror on one side and a flat mirror on the other side. Furthermore, it should be appreciated, that only one mirror need be utilized wherein that one mirror has a convex surace on one side and a flat surface on the other. The two mirrors are held by means of a bracket arrangement 58 which will be described in more detail in connection with FIG. 21.

Figure 4:
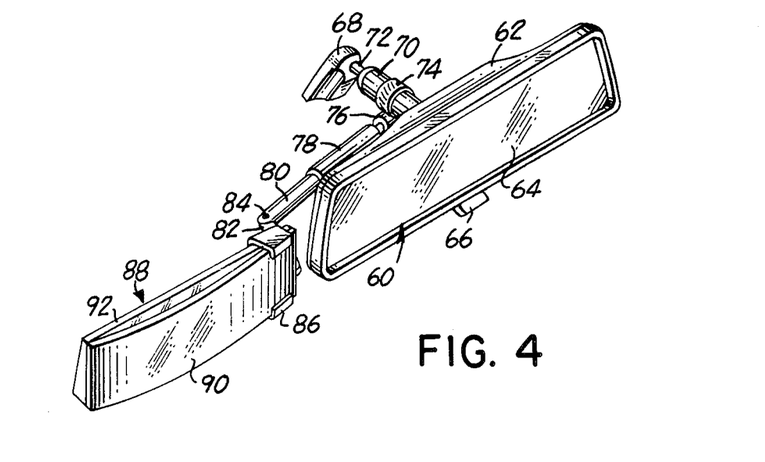
FIG. 4 is a perspective view showing the mirror assembly of the present invention coupled to an existing standard rear view mirror.

Referring now to FIG. 4, there is shown one embodiment of interconnecting the mirror assembly of the present invention with a standard rear view mirror. Specifically, the standard rear view mirror is shown generally at 60 and includes a housing 62 in which is set a prismatic mirror 64. A lever 66 is available for flipping the prismatic mirror between night and daytime glare-free viewing. The standard rear view mirror is held by means of a bracket 68 which is fastened directly onto the windshield, and an arm 70 extending between the bracket 68 and the housing 62 of the rear view mirror. A ball swivel 72 is typically formed at the junction between the arm 70 and the bracket 68. An additional ball swivel (not shown) will be placed between the arm 70 and the housing 62 of the rear view mirror.

Figures 5, 6, 7, 8:
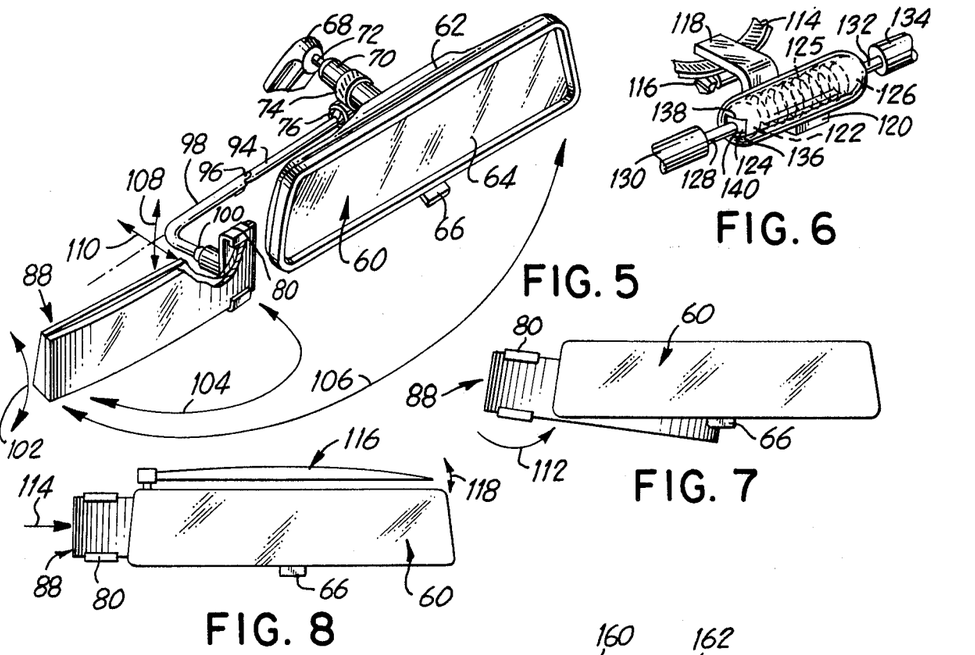
FIG. 5 is a partially broken away schematic view similar to that in FIG. 4 and showing another embodiment of the coupling arrangement.
FIG. 6 is a partially broken away perspective view showing the independent manipulation capabilities of the mirror assemblies of the present invention.
FIG. 7 is a schematic view showing one method of folding away the mirror assembly of the present invention behind a rear view mirror.
FIG. 8 is a view similar to that shown in FIG. 7 and showing other methods of folding the mirror assembly with respect to the standard rear view mirror.

The mirror assembly of the present invention is shown to be coupled onto the arm by means of a typical hose clamp 74 fastened around the body of the arm 70. A ball swivel joint 76 held in place by a strap of a type to be described in FIG. 6, is formed along an arm 78 extending from the hose clamp 74. A telescoping portion 80 is provided into the arm 78. At the forward end of the telescopic portion 80 a support arm 82 is further connected by means of a hinge pin 84. The support arm 82 is further connected by a ball swivel (not shown) to a C-clamp 86 which in turn holds the mirror unit shown generally at 88. The mirror unit itself is formed with a convex mirror 90 on one portion and a prismatic mirror 92 on another portion thereof.

With the arrangement as shown, the mirror unit 88 can be independently manipulated to position it at a desired location for proper viewing by the driver. Such manipulation can be achieved independently of the manipulation of the standard prismatic mirror 60. In this way, the driver can suitably position the standard rear view mirror 60 as desired and then independently thereof properly adjust the mirror unit 88 of the present invention.

Furthermore, the mirror unit 88 can be inverted so that either the convex mirror 90 or the prismatic mirror 92 will be available for use by the driver. It should be understood, that a housing could be placed about the mirror unit 88 with a suitable lever provided so that the prismatic mirror would be available for selecting between day and night glare free viewing.

Referring now to FIG. 5, there is shown an alternate embodiment of supporting the mirror unit 88 with respect to the main rear view mirror 60. In this case, supported by the hose clamp 74, is an arm 94 interconnected by means of the ball swivel 76 held in place by a strap of the type shown in FIG. 6. The arm 94 includes a hinge pin 96 interconnecting to an additional L-shaped arm 98 which is coupled by means of a ball swivel arrangement 100 to the back of a C-shaped clamp 86. This in turn holds the mirror unit 88 of the present invention.

By means of the arrangement shown in FIG. 4 or 5, the mirror unit can be manipulated in numerous positions. For Example, as shown in FIG. 5, the mirror unit can be suitably rotated about a horizontal axis as shown by the arrow 102. It can also be rotated about a vertical axis to properly position it as shown by the arrows 104. Furthermore, it can be completely folded so that it overlies the existing rear view mirror 60 as shown by the arrows 106. Additionally, it can be moved perpendicularly about the two orthogonal axis 108,110.

As shown in FIG. 7, in order to hide or move the mirror unit 88 out of position, it can fold around so that it is tucked away beneath the existing rear view mirror 60, as shown by the arrows 112. Alternately, the mirror units 88 can actually be slid within the C-shaped clamp 80 as shown in FIG. 8 by means of the arrow 114, thereby it is again tucked away behind the rear view mirror 60. It can also be bent into a position so that it overlies the top of the rear view mirror 60 in the position shown at 116 by rotating it in a direction as shown by the arrows 118.

Accordingly, by means of the particular coupling arrangement, the mirror unit of the present invention can be tucked away out of place either on top, underneath, in back of, or can actually be placed in front of the existing rear view mirror. Furthermore it can be inverted to either place the convex or flat surface in usable position. It can also be independently adjusted for proper viewing by the driver.

In this manner, the mirror unit of the present invention can be placed as a flat mirror adjacent to the existing mirror in order to provide a wider panoramic view of the rear. Alternately, the convex mirror can be utilized adjacent to the existing mirror whereby the driver will have the option of viewing a small portion of the rear through his regular flat mirror, or a wider range through his convex mirror.

Although only one laterally extending mirror unit 88 is shown in the left side, it should be appreciated, that this mirror 88 can actually be swung around or moved onto the rightside of the rear view mirror. Alternately, separate left and right mirror units can be utilized, as was heretofore shown in FIG. 1.

Referring now to FIG. 6, there is shown a particular clamping arrangement for suitably supporting a pair of mirror units. A hose clamp 114 with a screw locking mechanism 116 is used to securely bind a lever arm 118 to a post which would support the standard rear view mirror. The lever support 118 is shown as an Z-shaped member having a lower seat 120 which securely retains a housing unit 112 of substantially elongated cylindrical configuration and being hollow inside. An internal spring 125 is shown which is biased against an opposing pair of ball units 124, 126 each one forming part of a ball swivel joint. Extending from the ball 124 is a stem 128 which connects to the arm 130 from which is supported one mirror unit. A corresponding stem 132 connects to an arm 134 which would support another mirror unit.

It is noted, that at the lateral ends of the housing 122 there is provided a mouth 136 whose shape includes a substantially horizontal upper and lower lip edge 138, 140. These upper and lower horizontal lips serve to limit the play or vertical movement of the stem 128. A correspondingly shaped mouth would be positioned at the other end to correspondingly limit the vertical movement of the stem 132.

In this manner, although a ball swivel joint is provided for connection to each mirror unit, a limited amount of upward and downward movement is provided in order to prevent the possibility of the mirror unit from sagging into a complete downward direction. Nevertheless, the ball swivel joint does provide for sufficient movement to manipulate the mirror unit into a suitably desired position.

Figure 9:
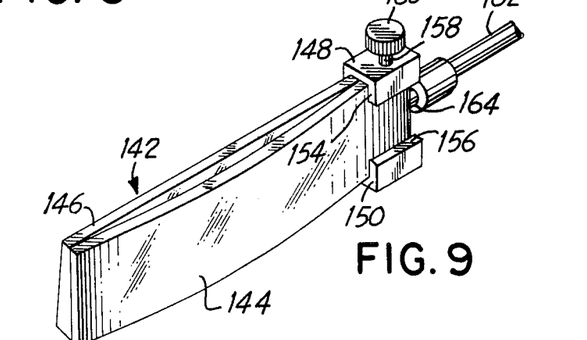
FIG. 9 is a perspective view showing a clamping arrangement for supporting the mirror unit of the present invention.
Figure 10:
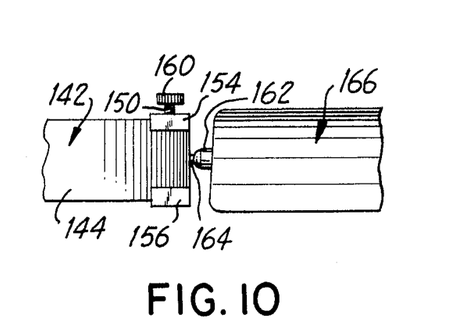
FIG. 10 is a partially broken away front view showing the clamping arrangement holding the mirror, with one surface selected for rearward facing.
Figure 11:
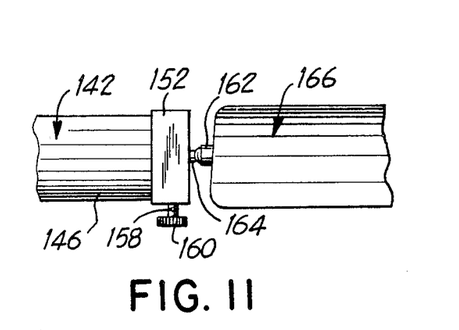
FIG. 11 is a view similar to that shown in FIG. 10 showing the mirror being inverted.

Referring to FIGS. 9–11, there is shown a detailed embodiment of utilizing a C-shaped clamp for supporting the mirror unit. The mirror unit shown generally at 142 again includes a front convex mirror 144 and a back prismatic mirror 146. A flat mirror could alternately be utilized at 146. The mirrors could also be placed within a housing unit. The mirror unit is retained by means of a substantially C-shaped clamp having an upper leg 148, a lower leg 150 interconnected by a bight portion 152. Both upper and lower legs terminate in downwardly depending grasping flanges 154, 156, respectively. A set screw 158 with a wide knurled knob 160 is provided to tighten the clamp onto the mirror unit.

Laterally extending from a side of the clamp there is provided an arm 162 connected by means of a ball swivel joint 164. The arm 162 could connect to an adjacent standard rear view mirror 166, or would be connected to the arm supporting the rear view mirror.

As shown in FIG. 10, the C-shaped clamp retains the mirror unit 142 in one of its positions with the convex shaped mirror 144 facing toward the driver so that the driver can utilize the convex mirror portion. When desired, the mirror unit 142 can be inverted, as shown in FIG. 11, whereby the flat or prismatic portion 146 of the mirror unit 142 is now facing toward the driver and available for use by the driver.

Figures 12, 13, 14:
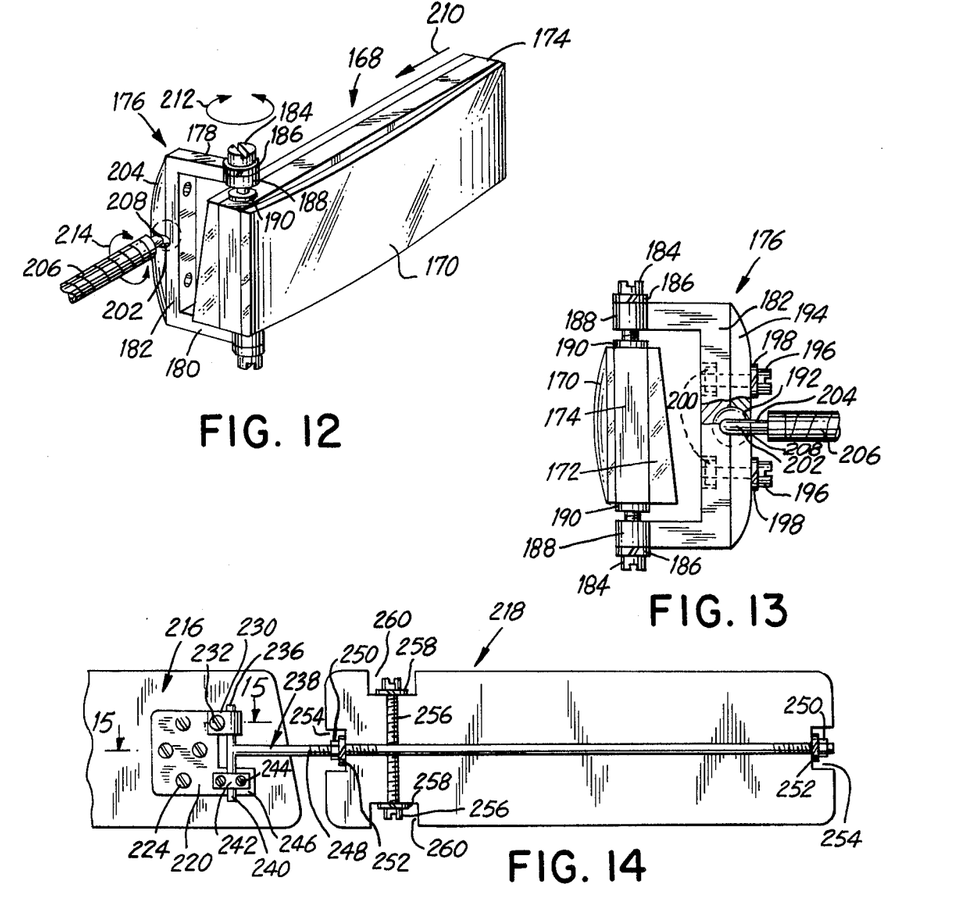
FIG. 12 is a perspective view showing another clamping arrangement for holding the mirror unit of the present invention.
FIG. 13 is a partially broken away side view of the clamping arrangement shown in FIG. 12.
FIG. 14 is a schematic view showing a coupling arrangement between the mirror unit and an existing rear view mirror.

Referring now to FIGS. 12 and 13, an alternate arrangement of retaining the mirror unit is provided. Again, the mirror unit 168 is formed of a convex mirror 170 on one side and a flat or prismatic mirror 172 on the opposite side. In this case, the two mirrors are joined by means of a central substantially rectangular block-like section 174. The upper and lower edges of the block 174 could be provided with channels or grooves.

The clamp unit 176 again is in the form of a C having upper and lower arms 178, 180 interconnected by a bight portion 182. A pivot is formed both on the top and bottom of the arms 178, 180. Each pivot includes an adjusting screw 184 which passes through a lock washer 186, and a circular receiving bushing 188 at the distal end of the arms of the clamp. It terminates in a lower foot member 190 which can pass along the surface of the block 174.

A ball swivel unit is formed into the bight portion of the clamp by providing a spherical opening 192 into the bight portion 182. A cover or clamping member 194 is securely connected onto the bight portion by means of the screws 196 and the lock washers 198 held by means of the nuts 200. The spherical opening 192 continues within the cover member 194.

The ball of the ball swivel 202 includes a stem 204 which continues into the arm 206. Again, the mouth 208 of the spherical opening has horizontally oriented lips to limit the upper and lower movement of the arm 206.

Using the embodiment shown in FIG. 12 and 13, it is noted that the C-shaped clamp 176 supports the mirror unit 168 from a position away from the driver. Accordingly there is no blockage on the front of the mirror and, accordingly, the mirror can be abutted directly adjacent to an existing rear view mirror to avoid any substantial gap therebetween. In addition, even upon inverting the mirror, again the C-shaped clamp will still remain in the back. Specifically, as shown in FIG. 12 the convex portion is facing the driver so as to be able to view the rear of the vehicle. When it is desired to invert the mirror, the mirror unit 168 is slid to the left, as shown by the arrow 210, until the clamp holds the opposite end of the mirror unit. The mirror unit is then swung around 180 degrees, as shown by the arrow 212, and then the prismatic or flat surface 172 will be placed facing the driver. However, again it will be noted that the C-shaped clamp will still be in a position away from the driver and will not interfere with viewing.

Additionally, because of the ball swivel, there is still possible the complete manipulation ability of the mirror and, as shown by the arrows 214, the mirror can still be adjusted in all different directions as required by the driver.

Figure 15:
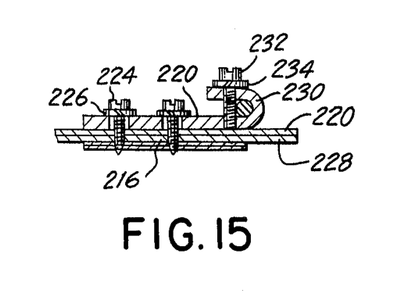
FIG. 15 is a cross sectional view taken along line 15—15 of FIG. 14.
Figure 16:
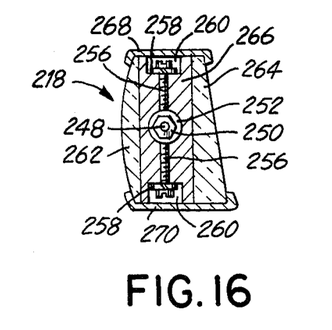
FIG. 16 is a vertical cross sectional view taken through the mirror unit of FIG. 14.

Referring now to FIGS. 14–16, there is shown an embodiment wherein the mirror unit of the present invention can be attached directly to the rear of an existing rear view mirror, rather than attached to the arm supporting the rear view mirror. Specifically, as shown, rear view mirror 216 is normally provided on the vehicle. The mirror unit of the present invention 218 would be connected thereto. The connection is provided by means of a plate unit 220 which is fastened onto the back of the existing rear view mirror 216. The fastening can be achieved either by means of a plurality of screws 224, which are held in place by the lock washers 226, or by means of an adhesive 228 which is placed behind the plate 220.

The plate 220 includes an upper U-shaped clamp portion 230 retained in place by the clamping screw 232 and a washer 234. The U-shaped portion 230 together with the clamping screw 232 provides a channel for receiving one leg 236 of a T-shaped member 238. By means of the clamping screw 232, that portion of the leg is hingedly retained in place. The other leg portion 240, of the T-shaped member is retained by means of a clamp 242 held in place by retaining screws 244 onto a tab portion 246 of the plate 220.

The elongated leg 248 of the T-shaped member is threaded, at least along a portion thereof, and passes into the center of the mirror unit 218. This is retained in place, by means of a nut 250 and lock washer 252 at either opposing ends of the unit 218 which fit within recesses 254.

The threaded rod 248 is held in place by means of an opposing pair of locking screws 256 and lock washers 258 which are placed within grooves 260.

As best shown in FIG. 16, the mirror unit itself is formed of the convex mirror 262 on one side, the prismatic or flat mirror 264 on the other side and the central block housing 266 in the center through which the threaded rod 248 passes. The unit is retained by means of an upper and lower clamping member 268, 270 which holds the unit in place. These clamping members could be formed as part of an overall housing holding the unit.

With the embodiment shown in FIGS. 14–16, the mirror assembly of the present invention can be easily connected to an existing mirror and still provide the independent adjustability of the mirror unit. It is noted, that the T-shaped member effectively provides for a hinge which can move in two orthogonal directions. The first movement of the hinge is about the axis formed by the legs 236, 240, and the second would be about the axis of the rods 248. Furthermore, the mirror unit 218 can be inverted to selectively provide use of the convex or prismatic parts of the mirror.

Figure 17:
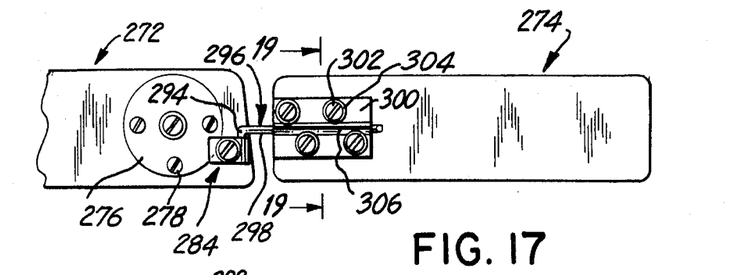
FIG. 17 is another embodiment showing a coupling arrangement for connecting the mirror unit of the present invention to an existing rear view mirror.
Figure 18:
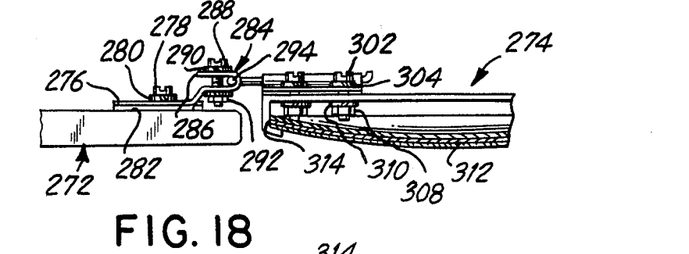
FIG. 18 is a partially broken away top view of the clamping arrangement shown in FIG. 17.
Figure 19:
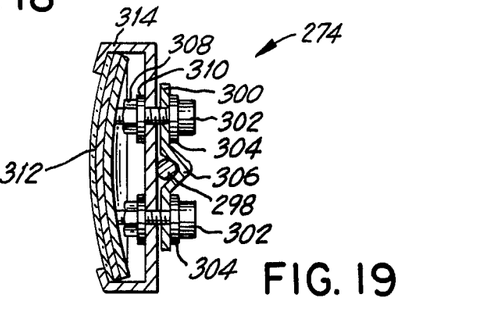
FIG. 19 is a cross sectional view taken along lines 19—19 of FIG. 17.

Referring now to FIGS. 17–19 there is provided an alternate method of connecting the mirror unit of the present invention to the back of an existing rear view mirror. The existing rear view mirror is shown generally as 272 and the unit to be attached to shown generally at 274. The connecting mechanism includes a circular plate member 276 which is fastened to the back of the rear view mirror 272 by means of the fastening screws 278 and the lock washers 280. A layer of adhesive material 282 could also be interposed in order to provide secure connection to the back of the rear view mirror 272.

The circular plate 276 includes a dog leg portion 284 which has a U-shaped clamp 286 formed therein which legs of the clamp are retained in place by means of the screw 288, the lock washer 290 and the nut 292. The clamp 286 and the screw 288 define a channel in which is inserted one leg 294 of an L-shaped member shown generally at 296. Securing the legs 294 in place provides a hinge about the axis of that leg. Two screws 288 could be used for additional stability.

The other leg 298 of the L-shaped member 296 passes into a channel formed behind the mirror unit 274. That channel is defined by means of a plate 300 secured in place by means of the threaded screws 302 and the lock washers 304. The plate 302 includes a substantially V-shaped central section 306 which forms the channel in which passes the leg 298 of the L-shaped member 296. The screws 304 are held in place by means of nuts 308 and the lock washers 310.

The unit 274 itself includes the forward convex mirror section 312 held within a housing unit 314. The mirror unit 274 could also be formed with the prismatic mirror on the rear surface thereof.

Again, utilizing the embodiment of FIGS. 17–19, the mirror unit can be moved about two orthogonal axes and also inverted as desired.

Figure 20:
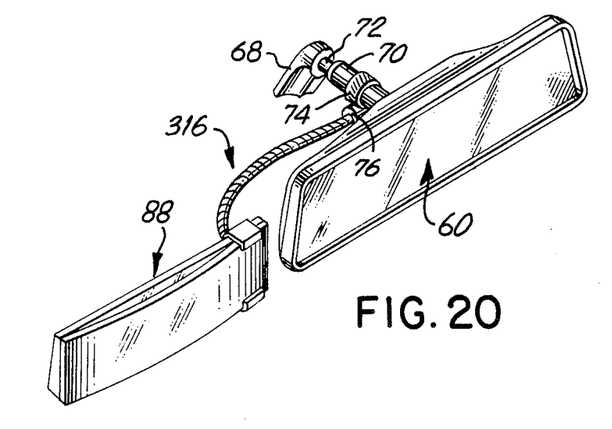
FIG. 20 is a perspective view showing another embodiment of the interconnection between the mirror assembly of the present invention and an existing rear view mirror.

Referring to FIG. 20, there is shown another way of connecting the mirror unit to the arm which supports the standard rear view mirror. Essentially, this embodiment would be similar to that shown in FIGS. 4 and 5, and numbers are correspondingly indicated. The only difference is that a goose neck arm 316 interconnects between the mirror unit 88 and the main rear view mirror 60. The flexible gooseneck provides the ability for manipulating and positioning the mirror unit. By placing a heavy wire within the gooseneck, the flexibility can be reduced. Also, by making the gooseneck thick enough, sufficient stiffness is provided to retain the mirror unit at the desired location.

While the mirror assembly heretofore described was in connection with rear view mirrors, it should be appreciated that it could similarly be combined with side view mirrors, or utilized by itself as a side view mirror.

Figures 21, 22:
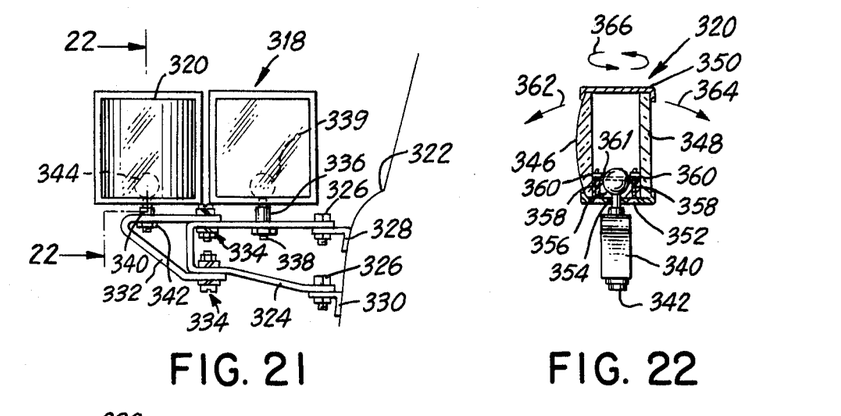
FIG. 21 is an elevational view showing the mirror assembly of the present invention being utilized as a side view mirror in accordance with one embodiment thereof.
FIG. 22 is a cross sectional view taken along lines 22—22 of FIG. 21.

Specifically, as shown in FIG. 21, there is indicated a side view mirror assembly including a first side view mirror 318 positioned next to a second side view mirror 320. Either one, or both of the side view mirrors could include a convex mirror on one side thereof with a flat mirror on the other side thereof. The side view mirrors are retained to the side of the car 322 by means of a first substantially U-shaped bracket 324 which is connected to the outside door of the car. The bracket is connected by means of nuts, bolts and lock washer assemblies 326 which in turn connect to L-shaped arms 328, 330 which are directly welded or screwed onto the car.

A further bracket member 332 is also provided which is in turn held onto the U-shaped bracket 324 by means of additional nut, bolt, and lock washer assemblies 334. It should be appreciated that both the assemblies 326 and 334 permit pivoting of the bracket with respect to each other and with respect to the car. The mirror unit 318 is securely held to the bracket 324 by means of the arm 336 held in place by means of the nut 338. A ball swivel joint 339 is connected at the end of the arm 336. A corresponding arm 340 is supported from the bracket 332 and held by means of the nut 342 which also has a ball swivel joint 344 at the upper end thereof to connect to the mirror 320.

As shown in FIG. 22, the mirror unit 320 is formed of a convex mirror 346 at one side thereof and a flat mirror 348 at the other end thereof. A housing 350 would surround the two mirrors and retain them securely in place. The ball swivel enters into the bottom wall 352 of the housing and is held in place by means of a plug portion 354 having a spherical seat 356 formed therein. The plug portion 354 is retained to the bottom wall 352 of the housing by means of the screws 358 and the nuts 360 holding a plate 361.

By means of the ball swivel arrangement, the mirror unit 318 and 320 can be suitably adjusted as shown by the arrows 362, 364 to provide the proper position for the driver. Additionally, it can be completely rotated about the ball swivel, as shown by the arrows 366 to permit complete inversion of the mirror to selectively place the convex or flat portions thereof for use by the driver.

Figure 23:
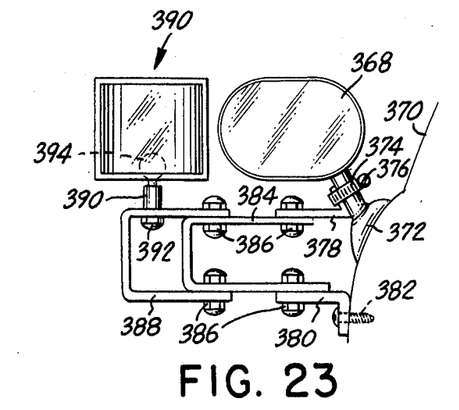
FIG. 23 is an elevational view of another embodiment of the mirror assembly being utilized as a side view mirror.
Figures 24, 26:
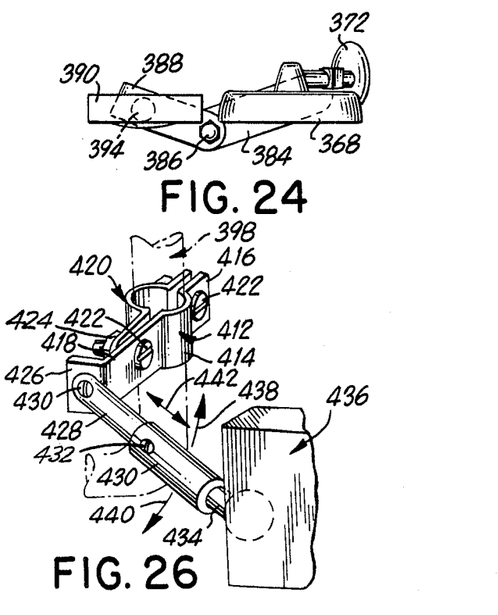
FIG. 24 is a top view of the arrangement shown in FIG. 23.
FIG. 26 is a perspective view of a clamping arrangement for clamping the mirror assembly of the present invention to an existing portion of a side view mirror.

Referring to FIGS. 23 and 24, there is provided an alternate type of connecting mechanism for a side view mirror. In FIG. 23, there is shown an existing rear view mirror 368 held in place onto the car 370 by means of the arm 372. A hose clamp 374 held in place by means of a lock screw 376 retains a substantially L-shaped arm 378. Another arm 380 is fastened into the car door 370 by means of a fastening screw 382. The two arms 378, 380 are connected to a substantially U-shaped bracket 384 by means of the nut and bolt assemblies 386 which provide pivotal movement therebetween. In turn, a second substantially U-shaped bracket 388 is connected to the first U-shaped bracket by means of additional nut and bolt assemblies 386.

The mirror unit 390 of the present invention is in turn connected to the second bracket 388 by means of an arm 390 which is secured in place by means of the nut 392. A ball swivel arrangement 394 is connected to the housing of the mirror unit 390.

As shown in FIG. 24, the unit is completely flexible so as to permit independent manipulation of the existing side view mirror 368 as well as the additional mirror unit 390. Furthermore, the mirror unit 390 can be completely inverted so as to selectively place a convex or flat mirror as available for use. Furthermore, because of the double bracket arrangement, one mirror can actually be folded onto the other. In folding them, the two brackets must be slightly moved out of a vertical plane and then can be folded onto each other. As a result, should the driver not want to use the second mirror, he can actually fold it in front of or behind the first and thereby completely tuck it away so that it will not be available at all and will avoid any excessive extension beyond the normal side view mirror of the car.

The embodiments of FIG. 21 can accordingly be provided with two mirrors each of which have a convex mirror on one side and a flat mirror on the other side. In this manner, the combinations that can be utilized include two adjacent flat mirrors, two adjacent convex mirrors, a flat and convex or a convex and flat. Alternately, one mirror can be tucked away and only the first mirror utilized. Alternately, instead of having two mirrors, only a single mirror can be provided with the single mirror having a convex on one side and a flat a prismatic on the other side. This would provide the driver with the ability to select which mirror he desires and can use the mirror accordingly.

Figure 25:
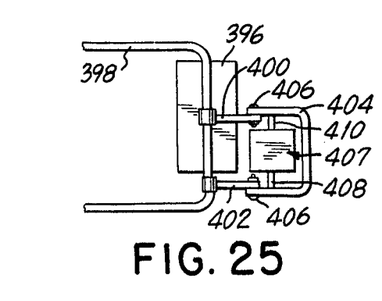
FIG. 25 is a schematic view showing another interconnection between the mirror assembly and the side view mirror.

FIG. 25 shows another method of interconnecting a secondary mirror having a convex surface on one side and a flat mirror on the other surface. The main side view mirror 396 is shown interconnected by means of a large U-shaped bracket 398. This type of arrangement is typically used on trucks. By interconnecting the arms 400-402 onto the main bracket 398, a secondary bracket 404 can be connected to the arms 400, 402 by means of the nut and bolt assemblies 406. Pivotally suspended between the legs of the U-shaped bracket 404 can be placed the additional mirror unit of the present invention 407. Suitable ball swivel arrangement 408, 410 can be provided for the necessary inversion required.

A particular useful type of clamp which can connect onto the bracket 398 is shown in FIG. 26. The clamp includes a first clamping member 412 having a cylindrical section 414 with laterally extending flat wings 416, 418. A correspondingly shaped member 420 is provided on the other side and is clamped to the first portion 412 by means of the clamping screw 422 held in place by means of the nuts 424. In this manner, the two sections 412, 420 can clamp around the bracket 398 and hold it tightly.

At the end of the lateral wing section 418, there is provided a flange 426 substantially orthogonal thereto. A rod 428 is pivotally secured to the flange section 426 by means of the screw 430. An additional rod section 430 is connected by means of the screw 432 and supports a ball swivel arrangement 434 which is connected the mirror unit 436.

Utilizing the arrangement as shown, the unit can be pivoted about the pivot 430 in a direction shown by the arrows 438, 440. At the same time, the ball swivel unit 434 can be used to invert the mirror unit 436 and also to suitably position it for proper adjustment by the driver. The extension to which the unit 436 extends from the car can also be telescopically adjusted as shown by the arrow 442 by adjusting the screw 432.

Figure 27:
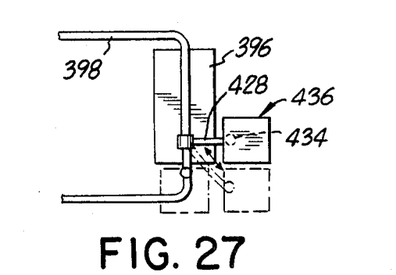
FIG. 27 is another embodiment showing the interconnection of the clamping arrrangement of FIG. 26.

Utilizing the clamp shown in FIG. 26, the mirror unit 436 can be adjusted to the various positions as shown in FIG. 27. Accordingly, because of the pivot arrangement provided, the mirror 436 can be placed adjacent to the existing side view mirror 396, or angled downward diagonal to, or positioned beneath it.

Figure 28:
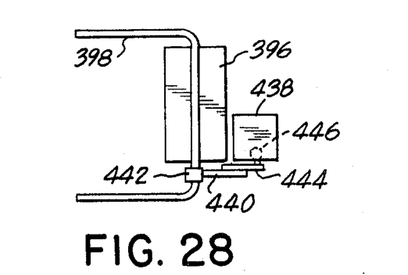
FIG. 28 is another embodiment showing the interconnection between the mirror assembly of the present invention and the existing side view mirror.

FIG. 28 provides for still another embodiment of interconnecting the mirror unit 438 to the existing side view mirror 396 by connecting a first arm 440 by means of a clamp 442 to the bracket 398 and having the cantilevered arm 440 support a second arm 444 to which is connected the ball swivel 446 interconnecting to the mirror 438.

It should be be appreciated that numerous other embodiments can be utilized to interconnect the mirror unit of the present invention to existing side view mirrors. Furthermore it should be appreciated that instead of ball swivels, hinge arrangements could be similary utilized. Also, a rim or housing could be placed around the mirror as desired.

Referring now to FIGS. 29-33, there is shown another possibility of utilizing the mirror assembly by placing it in conjunction with the left and right sun visors. More specifically, the right rear view mirror is shown generally at 450 and the left sun visor is shown at 452. The right sun visor is pivotally retained about a pivot rod 454 having one end connected to a bracket 456 which is connected to the vehicle. The other end of the pivot rod 454 is connected to a center bracket 458 which also supports the pivot rod 460 on which the left sun visor 452 pivots. The opposite end of the pivot rod 460 is secured within the bracket 462 also attached to the vehicle. Supported from the center bracket 458 is an arm 464 which supports the standard rear view mirror 466 normally existing in the vehicle.

Figures 29, 30:
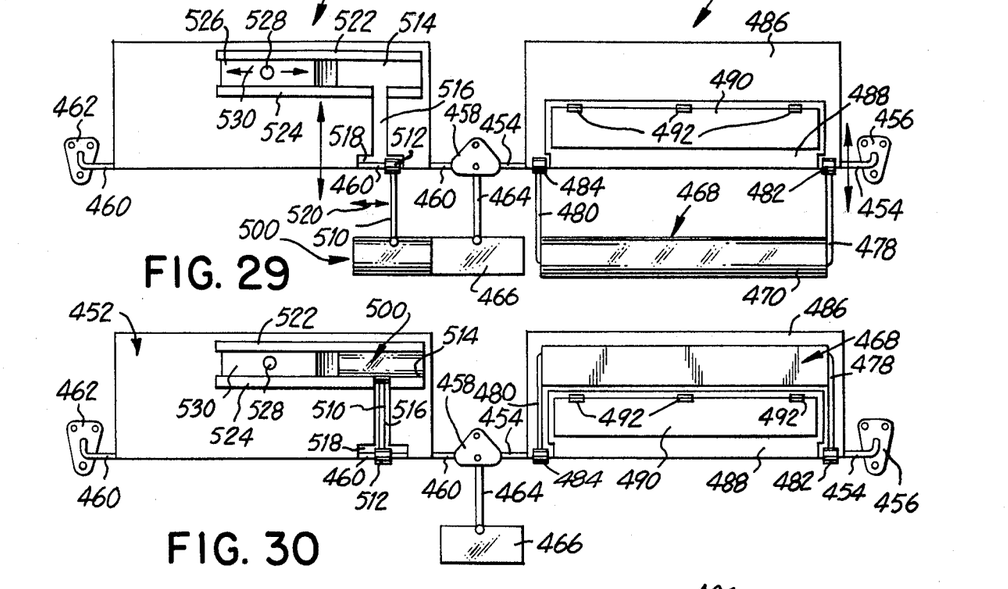
FIG. 29 is a front view of an embodiment having left and right mirror assemblies formed as part of the sun visors of the vehicle, and showing the assemblies in their lowered, operative positions.
FIG. 30 is a view similar to FIG. 29 showing the mirror assemblies in their raised position.

The mirror assembly can be integrally formed within the sun visors to thereby avoid the necessity of having an additional piece of equipment extending from the windshield which might otherwise disturb the driver or passenger. This mirror assembly can be utilized when desired but can also be stored within the sun visor so that it will not take up extra room when not in use. Two different versions of the mirror assembly integrally included within a sun visor is shown. The one connected to the right sun visor 450 is shown larger since it will be utilized by the driver and will not be in the way of the driver. The one of the left, associated with the sun visor 452, is shown to be shorter so as to not interfere with the vision of the driver through the windshield.

Figures 31, 32, 33:
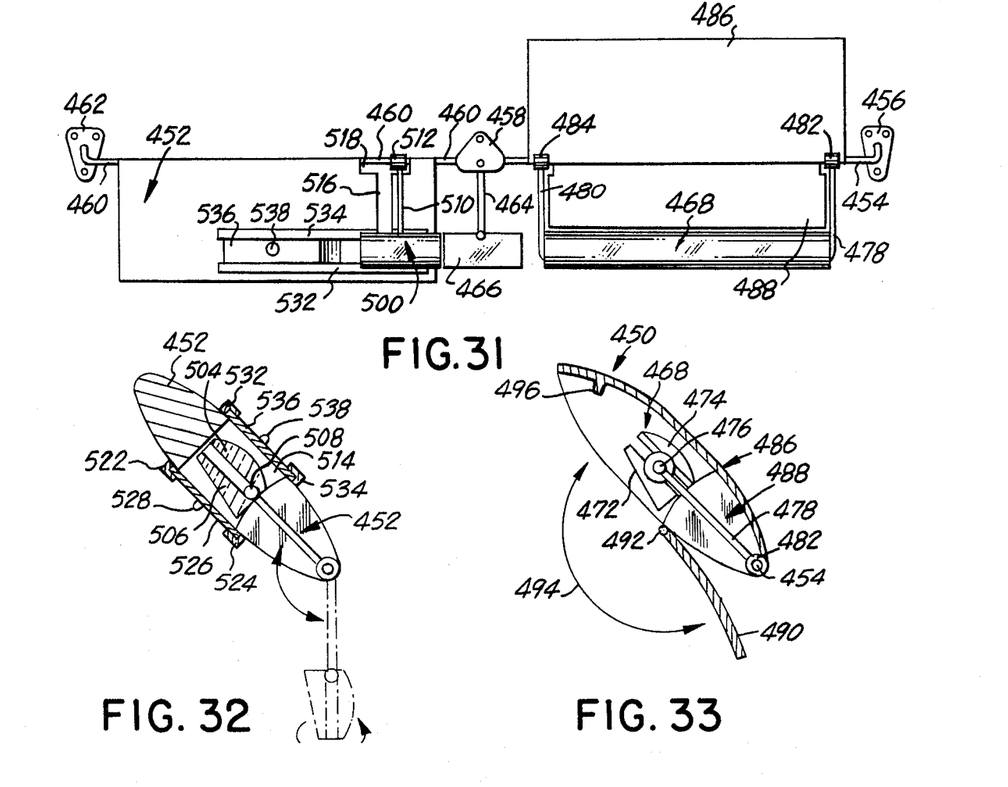
FIG. 31 is a view similar to FIG. 30 showing another position of the sun visor.
FIG. 32 is a side, partially sectioned view of the left sun visor.
FIG. 33 is a side, partially sectioned view of the right sun visor.

The mirror assembly on the right sun visor 450 is shown generally at 468 and includes the mirror 470 which can have a flat or prismatic surface 472 on one side thereof and a conve mirror 474 on the other side thereof, as shown in FIG. 33. The two sections of the mirror are held in place about a pivot rod 476 whose opposing distal ends terminate in the arms 478 and 480. Each of these arms are interconnected by means of the couplers 482, 484 to the pivot rod 454 supporting the sun visor 450. In this manner, the mirror assembly 468 can be pivoted down from the sun visor when desired and in its downward position the two mirrors, either the convex or the flat or prismatic, can be positioned to face the driver so that he can utilize whichever he desires.

As best seen in FIG. 33, the sun visor itself is formed of three layers. The rearmost layer 486 constitutes the basic sun visor and, when the entire sun visor is desired to be placed in its lowered position, the entire rear section 486 is pulled downward from its raised position.

When not in use, the mirror assembly 468 can be swung up to a position shown in FIGS. 30 and 33 where it will be stored in front of the rear section 486. In its stored position, it is placed over an intermediate section of the rear view mirror shown in FIGS. 31 and 33 as section 488. This section is also pivotal about the pivot arm 454.

The final section of the sun visor is shown as the flap 490 which is hingedly secured by means of the hinges 492. In its lowered position, the flap 490 moves downward as shown by the arrow 494 in FIG. 33 so as to give access to the mirror assembly 468. In its raised position, it can cover the mirror assembly 486 and will be tucked beneath the hook 496, shown in FIG. 33.

The various positions of the mirror are shown as follows. When the mirror assembly 468 is desired to be utilized, the flap 490 is lowered, as shown in FIG. 29, and the mirror assembly 468 is swung downwardly. It can then be positioned either with its convex or its flatter prismatic surface facing the driver. When the sun glares, and when the mirror assembly is being utilized, it will be noted that there will be a space above the mirror assembly 468 through which the sun can come. If the entire sun visor rear wall 486 were lowered, it would also cover the mirror assembly 468. Accordingly, it is only desired to cover a section above the mirror assembly 468. For this purpose, the intermediate section of the sun visor 48 can be lowered, as shown in FIG. 31, to fill the space between the top of the car and the mirror assembly 468.

When it is no longer desired to use the mirror assembly 468, it can be raised back to its position as shown in FIGS. 30, and 33. Should one not want to have the mirror 468 exposed, he can then move up the flap 490 to its upper position, where it covers the mirror assembly 468.

Should it be desired to utilize the sun visor in its normal manner without utilizing the mirror assembly, the entire rear wall 486 is lowered which will pull down the entire sun visor as a unitary assembly. In order to store the intermediate section of the sun visor 488 and the mirror assembly 468, it is noted that the rear wall 486 as well as the flap 490 were curved in an electrical manner to provide a storage space therein.

The left sun visor 452, also includes a mirror assembly 500, however, this operates in a manner different from the one on the right sun visor. One reason for this is that it is desired to move this mirror assembly 500 out of the way of the driver so as not to block his view through the flat windshield. The mirror assembly 500 can include a convex mirror 504 on one side and a flat or prismatic mirror 506 on the other side. The mirror itself can be pivoted around about the pivot point 508. The mirror assembly 500 is held by means of an arm 510 having a coupling member 512 which can slide along a section of the arm 460 supporting the sun visor 452. For this purpose a cut out section 514 is provided in the sun visor which corresponds in shape to the mirror assembly 500. A section 516 is cut out of the sun visor corresponding to the arm 510 and a lower section 518 is cut out permitting movement of the coupling member 512 as it slides along the arm 460, as shown by the arrow 520.

Above and below the cut out section 514, there are provided brackets 522, 524 which form a channel. These brackets 522, 524 extend leftward past the opening 514. A coverplate 526, conveniently including a knob 528 slides back and forth within the channel, as shown by the arrows 530.

On the rear of the sun visor, as shown in FIGS. 31 and 32, there are provided the brackets 532, 534 which in turn create a channel along which slides the cover plate 536 manipulatable by means of the knob 538.

In operation, when it is desired to use the mirror assembly 500, the cover plate 530 is moved to the left exposing the mirror assembly 500, as shown in FIG. 30 and the mirror assembly 500 is then swung down, as shown in FIG. 29. The mirror assembly can then be suitably adjusted and slid over so that it is adjacent to and in fact abuts the existing rear view mirror 466 so as to provide a continuous mirror therefrom.

When it is no longer desired to be utilized, the mirror assembly is moved left and swung back upward to its storage position. The cover 530 can then be slid to cover the mirror so that it will not be exposed. Should it be desired to lower the sun visor, the rear cover plate 536 can be slid so as to cover the mirror assembly 500 so that it will not interfere with the driver. Alternately, even with the sun visor in its lowered position, as shown in FIG. 31, it is possible to make use of the mirror assembly 500 by sliding the cover plate 536 to the left and thereby again exposing the mirror assembly 500, even when the sun visor 452 is in its lowered position.

It should also be appreciated that the three mirrors can be aligned so that they all lie along a common axis as shown in FIG. 29. In this way, there is little disturbence to the driver and he is able to utilize all three mirrors as desired.

There has been disclosed heretofore the best embodiments of the invention presently contemplated. However, it is to be understood that various changes and modifications may be made thereto without departing from the spirit of the invention.

I claim:

1. An auxiliary mirror assembly for a vehicle having a standard rearward viewing mirror, said auxiliary mirror assembly comprising:

a mirror unit having a convex mirror on one side thereof and a flat mirror on the opposing side thereof;

support means for holding said mirror unit;

coupling means for retaining said support means with respect to the vehicle, such that one of said sides of the mirror unit can be directed to face rearward of the vehicle, and manipulation means coupled to said support means for providing selective inversion of the mirror, whereby the desired one of said convex and flat mirrors can be selected as the rearward facing mirror, said manipulation means comprising means for positioning either one of the selected sides in a laterally adjacent, substantially coplanar and colinear position which is substantially contiguous with said standard rearward viewing mirror.

2. A mirror assembly as in claim 1, wherein said flat mirror is part of a prismatic mirror, and selector means for manipulating the prismatic mirror to provide for selective day and night glare free viewing.

3. A mirror assembly as in claim 1, wherein said rearward viewing mirror comprises a standard rear view mirror, means for flexibly attaching said rear view mirror to the vehicle, said coupling means comprising an elongated arm flexibly connected at one end to said attaching means, and adjustment means for providing movement of said rear view mirror independently of said mirror unit, whereby each can be independently adjusted.

4. A mirror assembly as in claim 3, wherein said support means comprises a C-shaped clamp slidably holding said mirror unit, and retained at the other end of said elongated arm, whereby said mirror unit can be slid within said clamp to a storage position behind said rear view mirror without swinging behind said rear view mirror.

5. A mirror assembly as in claim 4, wherein said manipulating means comprises a ball swivel unit interconnected to at least one of said ends of said elongated arm to provide for manipulation of said mirror unit.

6. A mirror assembly as in claim 5, wherein said manipulating means comprises a ball swivel unit at both ends of said elongated arm, whereby said mirror unit can be selectively stored on top of, beneath, or behind said rear view mirror.

7. A mirror assembly as in claim 4, wherein said manipulating means comprises a double hinge arrangement.

8. A mirror assembly as in claim 4, wherein said C-clamp comprises upper and lower arms interconnected by a bight portion, said clamp holding said mirror unit from behind, said mirror unit comprising a substantially rectangular block-like support member, said convex and flat mirrors connected to opposing sides of said support member, pivot means for pivotally and slidably retaining said top and bottom of said support member between said clamp arms, whereby said mirror unit can slide between said clamp arms from one side edge thereof to the other side edge thereof and pivot 180 degrees about an axis defined between said pivot means at said top and bottom thereof to thereby achieve inversion of the mirror unit.

9. A mirror assembly as in claim 8, and further comprising a ball swivel unit interconnected between said other end of said elongated arm and said bight portion.

10. A mirror assembly as in claim 3, wherein said elongated arm comprises a goose neck flexible rod.

11. A mirror assembly as in claim 5, wherein said ball swivel unit comprises a housing, a mouth formed in said housing, a ball with an elongated stem portion, spring means for holding said ball in said housing with said stem portion extending through said mouth, wherein said mouth is elongated in shape, having upper and lower lip edges which limit the vertical movability of said stem.

12. A mirror assembly as in claim 1, and further comprising a standard rear view mirror, and wherein said coupling means comprises means for connecting to the back of said standard rear view mirror, whereby said mirror unit is retained by said rear view mirror and yet independently manipulatable therefrom.

13. A mirror assembly as in claim 12, and comprising an L-shaped rod having two substantially perpendicular legs, first connecting means for pivotally connecting one leg to the back of said rear view mirror to form a hinge pivotal about one axis, and second connecting means for pivotally connecting the other leg to said mirror unit to permit rotation of said mirror unit about another axis perpendicular to said first axle.

14. A mirror assembly as in claim 12, and comprising means for retrofitting an existing rear view mirror with the mirror unit.

15. A mirror assembly as in claim 1, wherein said mirror unit is a side view mirror and wherein said coupling means comprises an arm extendable from a side of the car.

16. A mirror assembly as in claim 15, wherein said mirror unit comprises a housing supporting said convex mirror on one side and said flat mirror on the other side in spaced apart relationship, and said manipulation means comprises a ball swivel unit positioned in the bottom of said housing between said flat and convex mirrors, whereby said mirror unit can be inverted about a vertical axis therethrough.

17. A mirror assembly as in claim 15, and further comprising a standard side view mirror extending from a vehicle, and wherein said coupling means interconnects to said standard side view mirror.

18. A mirror assembly as in claim 17, wherein said standard side view mirror also comprises a convex mirror on one side thereof, and a flat mirror on the other side thereof, means for independently inverting said standard side view mirror, whereby said standard side view mirror and said mirror unit provides a selective combination of adjacent convex and flat mirrors.

19. A mirror assembly as in claim 17, wherein said coupling means comprises a clamp for clamping onto said standard rear view mirror, an arm pivotally coupled to said clamp, and a ball swivel interconnecting said arm and said mirror unit.

20. A mirror assembly as in claim 1, and further comprising a standard rear view mirror, and a reversible mirror unit laterally extending on either side thereof.

21. A mirror assembly as in claim 1, wherein said mirror unit is integrally formed within a sun visor, and comprising means for pivotally lowering said mirror unit from the sun visor and means permitting inversion of the mirror unit in its lowered position.

22. A mirror assembly as in claim 21, and comprising a sun visor having a front and rear wall defining a chamber therebetween, an intermediate pivotal visor section occupying a lower portion of said chamber, said mirror unit pivotally occupying an upper portion of said chamber and wherein a part of said front wall can be opened to provide access to said mirror unit.

23. A mirror assembly as in claim 22, wherein said front wall comprises a lower section forming the outer wall of said intermediate section, and an upper section pivoted with respect to said lower section.

24. A mirror assembly as in claim 21, and comprising a sun visor having a cut out section to accommodate said mirror unit, and said lowering means, and comprising sliding means for permitting sideways sliding of said mirror unit in both its raised and lowered positions.

25. A mirror assembly as in claim 24, and further comprising slidable cover means coupled to said sun visor for covering said mirror unit when it is in its raised position.

* * * * *